Feb. 23, 1943.　　M. E. MITCHELL　　2,312,115
THREAD CUTTING MACHINE
Filed May 27, 1941　　3 Sheets-Sheet 1
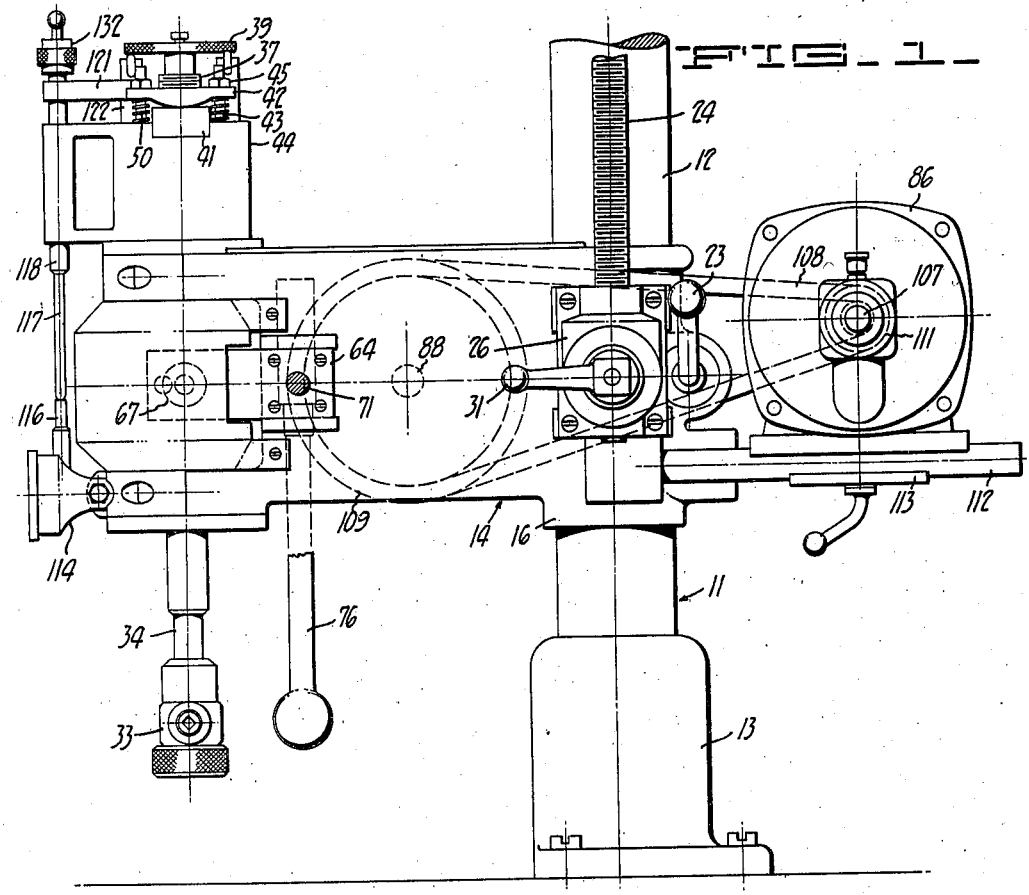
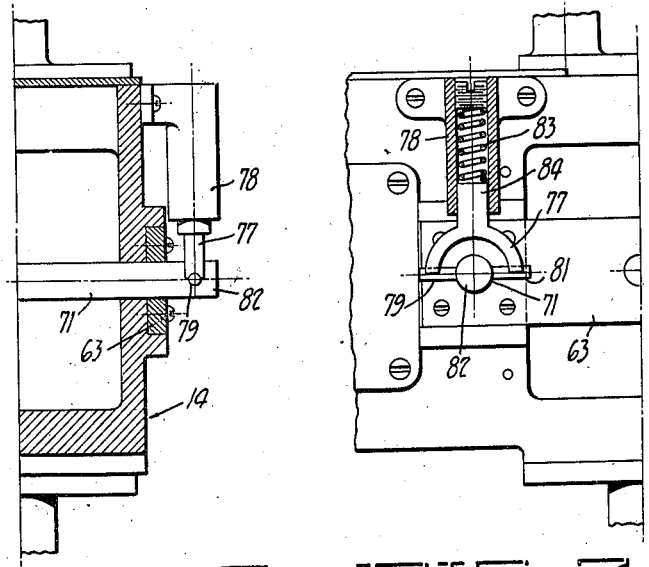 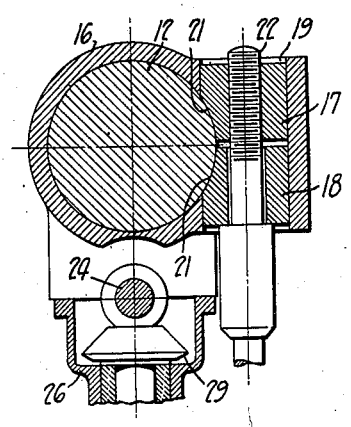
INVENTOR
Malcolm E. Mitchell
BY Joseph B. Gardner
his atty.

Feb. 23, 1943.  M. E. MITCHELL  2,312,115
THREAD CUTTING MACHINE
Filed May 27, 1941   3 Sheets-Sheet 2
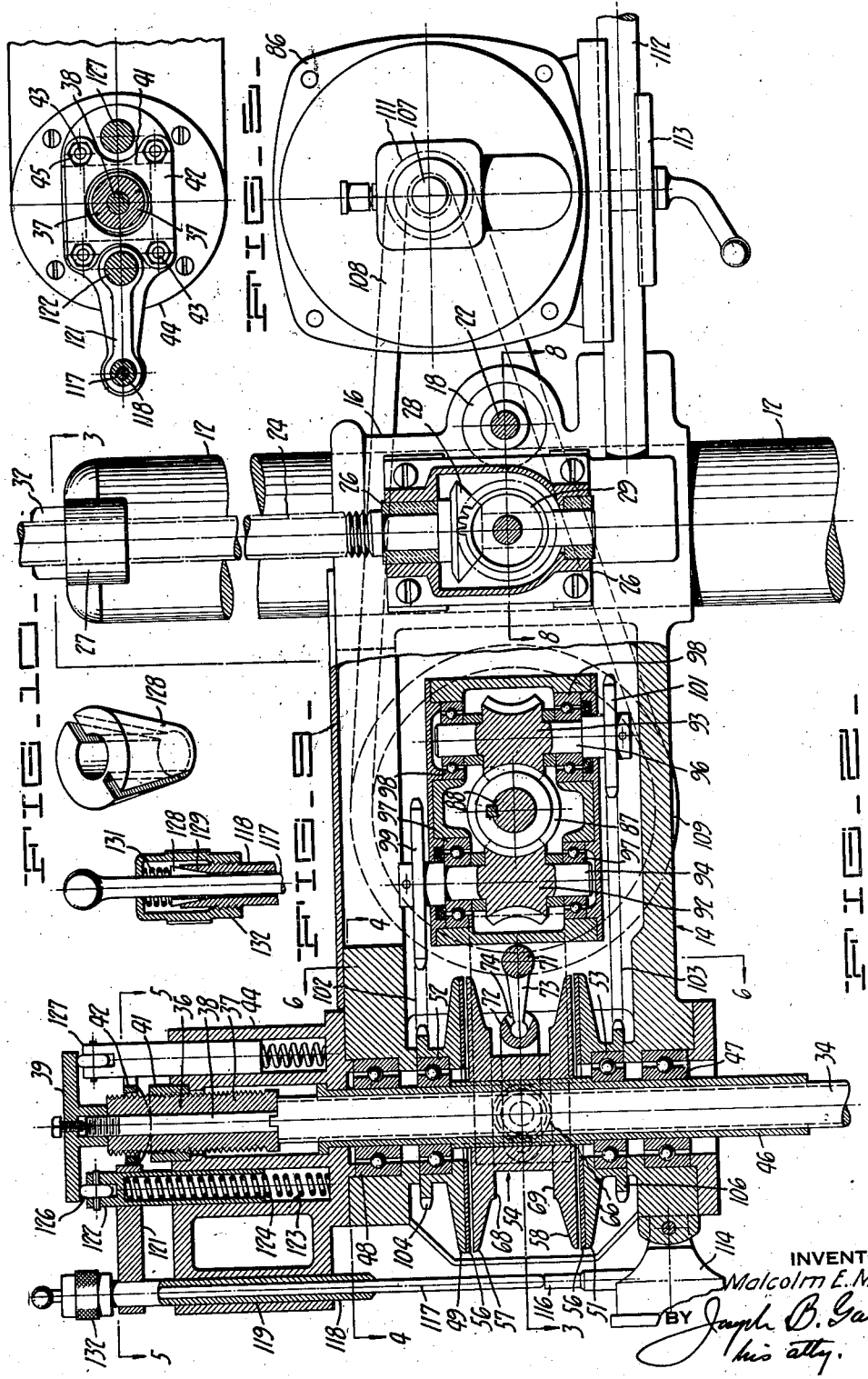
INVENTOR
Malcolm E. Mitchell
BY Joseph B. Gardner
his atty.

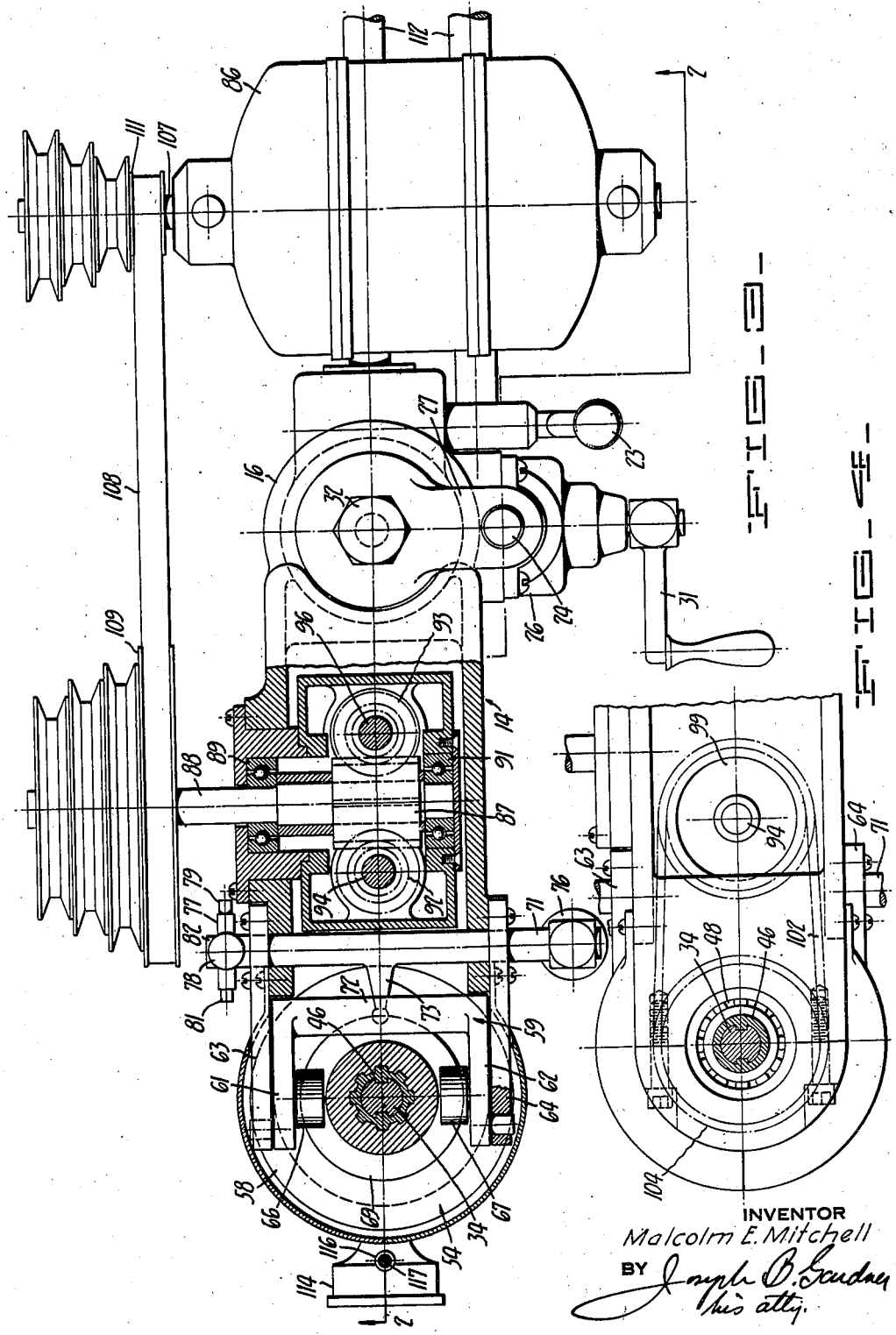

Patented Feb. 23, 1943

2,312,115

UNITED STATES PATENT OFFICE 2,312,115

THREAD CUTTING MACHINE

Malcolm E. Mitchell, Los Angeles, Calif., assignor of one-half to Leckinger's Machine & Experimental Co., Los Angeles, Calif., a partnership composed of Leon L. Leckinger and Helen E. Leckinger Application May 27, 1941, Serial No. 395,376

3 Claims. (Cl. 10—137)

The invention relates to machines provided with a thread cutting tool such as a tap or die or the like, and operating to apply the tool to the work with a rotary movement so as to cut threads on the part of the work engaged by the tool.

An object of the present invention is to provide a machine of the character described wherein both the advancing and retracting movements of the thread cutting tool relative to the work are controlled by a lead screw which exactly matches the thread to be cut, whereby the removal of the tool from the cut threads will be effected without a supporting engagement of the tool against the cut threads and all danger of injuring the cut threads due to a backing out of the tool against the cut threads is thus obviated.

Another object of the invention is to provide a machine of the character above wherein the lead screw means aforementioned may be quickly and readily applied to or removed from the machine, whereby any one of a plurality of leads matching various sizes and pitches of threads to be cut may be simply and readily incorporated in the machine at the selection of the operator.

A further object of the invention is to provide a thread cutting tool of the character described having an improved manually operated reversing mechanism controlling the forward and reverse feed of the thread cutting tool and by means of which the operator has a continuous and instantaneous control over the movement of the tool, and having a positive neutral position whereby the tool may be instantly stopped at any point in its advance or return movements and then reversed in its movement or continued in its former direction and wherein the manual control is so sensitive that the operator can feel and precisely control the thread cutting operation much in the same manner as in hand tapping.

Still another object of the invention is to provide a thread cutting machine of the character above having embodied therein an indicator mechanism which is automatically actuated upon the advance and return movements of the thread cutting tool to enable the operator to very accurately determine the length of the thread being cut.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a side elevation of a thread cutting machine constructed in accordance with the present invention.

Figure 2 is a vertical sectional view of the machine taken substantially on the plane of line 2—2 of Figure 3.

Figure 3 is a plan view of the machine with a portion thereof shown in cross-section as indicated by the plane of line 3—3 on Figure 2.

Figure 4 is a fragmentary plan sectional view taken substantially on the plane of line 4—4 of Figure 2.

Figure 5 is a cross-sectional view showing a part of the machine and taken substantially on the plane of line 5—5 of Figure 2.

Figure 6 is a fragmentary vertical cross-sectional view of the machine taken substantially on the plane of line 6—6 of Figure 2.

Figure 7 is a side elevation of a part of the machine, with some of the members shown in cross-section.

Figure 8 is a horizontal cross-sectional view of a part of the machine and is taken substantially on the plane of line 8—8 of Figure 2.

Figure 9 is a fragmentary vertical sectional view of the connection of the upper end of the indicator control rod.

Figure 10 is a perspective view of one of the parts illustrated in Figure 9.

The thread cutting machine of the present invention briefly comprises a support and a spindle threadably carried thereby for relative rotary and longitudinal movement of the spindle and adapted for connection to a tap or die or other thread cutting tool, a part adapted to be continuously rotated, members connected to the rotated part and continuously driven thereby in reverse directions, and a manually operated clutch member connected to the spindle and selectively engageable with the reversely driven members so as to provide a selective rotation of the spindle in opposite directions for applying the same to and removing same from the work to be threaded and wherein the clutch mechanism is so designed as to have a positive neutral position by means of which the thread cutting tool may be instantly stopped at any point in its advance or return movements. Other important features of the present construction will appear from the more detailed description in the following.

With reference more particularly to the accompanying drawings, the thread cutting machine is mounted on a supporting member 11 including a vertical standard or column 12 extending from a base 13. Mounted for vertical adjustment on the column 12 is a main body 14 having a cylindrical part 16, see Figure 8, surrounding the column 12 and adapted for securing thereto by means of a clamp including a pair of cylindrical members 17 and 18 mounted in a cylindrical opening 19 in the part tangentially to the column 12 and having segmental cylindrical portions 21 facing and complementary to the periphery of the column and cinched against the column periphery by means of a screw 22 extending through the member 18 and threaded through the member 17 and conveniently rotated at its forward end by a crank 23. Upon release of the clamping device, the body may be moved vertically upon the column and means for so moving the same here includes a vertically positioned screw member 24 journaled adjacent its lower end in a bearing box 26 secured to the body, see Figure 2, and threaded through a supporting arm 27 secured on the top of the column. Means for rotating the screw member 24 so as to cause a vertical displacement of the body on the column, here consists of a miter gear 28 secured to the lower end of the screw member and enmeshed with a miter gear 29 supported in the bearing box 26 at right angles to the gear 28 and rotated exteriorly by means of a crank 31 connected thereto. In view of the foregoing construction, the weight of the body of the machine is suspended on the screw member 24 during adjustment and by reason thereof I have found that a very smooth and ready adjustment of the vertical position of the body may be effected. Preferably, the arm 27 is pivotally secured to the top of the column centrally thereof as by means of a stud 32 so as to permit rotation of the body about the column, whereby the cutting tool may be positioned over various parts of the work.

In the present machine, a thread cutting tool such as a tap or die or the like is carried in a chuck 33 at the lower end of a vertical spindle 34 carried by the body 14 for relative rotational and vertical displacement and in accordance with the present invention, lead screw means 36 is provided for causing a vertical reciprocation of the spindle to apply and remove the cutting tool upon rotation of the spindle in opposite directions. The lead screw means 36 here consists of an exteriorly threaded sleeve 37 detachably secured to the upper end of the spindle 34 by mounting the sleeve upon a reduced end portion 38 of the spindle and clamping the same in place by means of a disc shaped nut 39 threaded onto the upper end of the reduced portion 38, the base of the sleeve 37 being keyed to the spindle for joint rotation therewith. Threaded onto the exterior of the sleeve 37 is a rectangular nut block 41 which is detachably secured in place and anchored to the body by means of a clamp 42 mounted over the block and secured in place on vertical studs 43 extending from a collar part 44 of the body by nuts 45 and springs 50 compressed between the clamp and body part 44. In view of this construction, the advancing and retracting movements of the thread cutting tool are precisely and accurately controlled by the lead screw which is supplied to the machine to exactly match the thread to be cut, whereby in the retracting movement of the tool, the same is removed from the work without a supporting engagement of the tool with the cut threads and all danger of injuring the cut threads by reason of the pressure of the tool against the threads in backing out, is thus eliminated.

Means for rotating the spindle in opposite directions to provide the aforementioned advancing and retracting movements of the thread cutting tool, here consists of a clutch mechanism which as a special feature thereof is provided with a positive neutral position by means of which the tool may be instantly stopped at any point in its advance or return movements and then reversed in its direction of movement or continued in its former direction. This mechanism, as will be best seen in Figures 2 and 3, includes a quill 46 which surrounds the spindle 34 and is journaled for free rotation in the body on bearings 47 and 48, the quill being keyed to the spindle so as to provide joint rotation therewith and at the same time permit free longitudinal movement of the spindle in the quill. Mounted for free rotation on the quill at longitudinally spaced portions thereof are clutch members 49 and 51, which as here shown are journaled on the quill by means of bearings 52 and 53 so as to hold the clutch members in fixed longitudinal positions on the quill but free to rotate relative to the quill and relative to each other. In accordance with the present construction these clutch members are continuously rotated in opposite directions and a third clutch member 54 is mounted on the quill for selective engagement with either of the clutch members 49 or 51 to transmit the rotation of these members to the quill and thence to the spindle. The clutch members 49 and 51 as here shown are provided with opposed disc faces which are preferably covered with a suitable clutch lining 56 and the center clutch member 54 is of spool shape having longitudinally spaced flanged ends 57 and 58 which are adapted upon appropirate longitudinal movement of the spool member to engage the lined end faces of the continuously rotated clutch members 49 and 51. The center clutch member 54 is here keyed to the quill for joint rotation therewith but for free longitudinal displacement on the quill so as to enable the selective longitudinal movement of the center clutch member to engage the clutch members 49 and 51.

Manually operated means is provided for longitudinally reciprocating the center clutch member 54 as aforementioned and as here shown, this means includes a yoke member 59 having opposed sides 61 and 62 which straddle the center part of the spool member 54 and are pivoted at their free ends to mounting brackets 63 and 64 along a common horizontal axis whereby upon swinging of the yoke member about its pivotal axis, the sides 61 and 62 thereof will be brought into juxtaposition to the inner faces of the flanged ends of the spool. Rollers 66 and 67 are carried by the sides 61 and 62 of the yoke member for engagement with parallel planar portions 68 and 69 provided on the inside faces of the flanged ends 57 and 58 whereby upon rocking of the yoke member, the center clutch member will be displaced longitudinally to the clutch members 49 and 51. Means for so rocking the yoke member here includes a shaft 71 extending horizontally through the body and journaled thereto at approximately the center plane of the center clutch member and in horizontally spaced position to the connecting side 72 of the yoke member 59. The shaft is here connected to the yoke side 72 by means of an arm 73 extending transversely from the shaft 71 and engaging in a receiving socket 74 provided therefor in the side 72 of the yoke. At the forward side of the machine, as viewed in Figures 1 and 3, a lever arm 76 is secured to the shaft 71 for manual oscillation of the same to cause a corresponding reciprocation of the center clutch member by means of the chain of mechanism above described, it being noted in this connection that a substantial increase in mechanical advantage is provided whereby a relatively wide range of movement of the lever 76 is provided for a relatively short longitudinal movement of the center clutch member.

As will be seen in Figure 2, substantial clearance is provided between the center clutch member 54 and the end clutch members 49 and 51, whereby the center clutch member may be moved to a neutral position, as illustrated in Figure 2, out of engagement with either one of the end clutch members. In accordance with the present construction and as an important feature thereof means is provided for normally urging the clutch mechanism to its neutral position wherein the movement of the cutting tool will cease notwithstanding the continued rotation of the clutch members 49 and 51. This means is best illustrated in Figures 6 and 7 and includes a clevis member 77 which is mounted in a crosshead 78 for vertical reciprocation and supported on diametrically opposed pin portions 79 and 81 carried by the end 82 of the shaft 71 extending to the rear of the body. The construction of the clutch mechanism and the connecting motivating parts is so arranged that the clutch will be in a neutral position upon positioning of the shaft 71 to a horizontal position of pins 79 and 81, and accordingly this shaft is urged to assume such position by the resilient pressing of the clevis member 77 against the pins 79 and 81. In the present instance the cross-head 78 is provided with a cylindrical opening which receives a cylindrical part 84 of the clevis member, and a helical spring 83 is compressed in the cylindrical opening above and against the clevis part. Thus rotation of the shaft 71 in either a clockwise or counter-clockwise direction will be accompanied by an elevation of the member 77 against the resilient action of spring 83 and consequently upon release of the operating lever 76 from a rotated position thereof from neutral, the spring 83 will cause the shaft to immediately return to neutral position. Accordingly in the operation of the device, the operator must apply a positive pressure to the operating lever 76 to move the clutch mechanism in either direction from a neutral position and this pressure reduces to nothing towards the neutral position whereby the clutch mechanism and the operating control therefor is self-centering in neutral position. I have found in the construction of the clutch mechanism and operating control therefor as aforesaid, that there is sufficient sensitivity in the transmission of forces through the mechanism as to enable the operator to feel the cutting operation, whereby he can maintain an instantaneous and precise control over the cutting tool much in the same manner as in hand tapping where the tool is actually supported by the hand of the operator.

Any suitable means may be used for continuously driving the clutch plate members 49 and 51 in opposite directions. As here shown an electric motor 86 is used as a source of power and is operatively connected to the clutch plates 49 and 51 by an appropriate drive mechanism providing the continuous rotation of the clutch plates in opposite directions and further providing in the present instance for a greater speed of rotation of the clutch plate 49 here effecting the retraction movement of the spindle. The drive means illustrated in the accompanying drawings, see Figures 2 and 3, includes a gear chain for obtaining the reverse rotational movements aforementioned and also for effecting a desirable reduction in speed and increase of available torque. Preferably and as here shown, this gear chain consists of a worm 87 operatively connected to and driven by the motor 86 and which is supported on a horizontal shaft 88 journaled in the body by means of bearings 89 and 91 and extending rearwardly of the body as viewed in Figure 3. Enmeshed with the worm 87 on opposite sides thereof are worm gears 92 and 93 which by reason of their diametrical positioning on the worm are rotated in opposite directions and are mounted on vertical shafts 94 and 96 journaled in the body in sets of bearings 97 and 98. The worm gears 92 and 93 are operatively connected to the clutch plates 49 and 51 by means of sprockets 99 and 101 mounted on the shafts 94 and 96 and connected by chains 102 and 103 to sprockets 104 and 106 here formed integrally with the clutch plates 49 and 51. Preferably the sprocket 89 connected to worm gear 92 is somewhat larger than sprocket 101 connected to worm gear 93 whereby the upper clutch plate 49 is rotated at a somewhat greater speed than clutch plate 51 so that the return movement of the cutting tool from the work will be effected at a somewhat greater speed than the advance cutting movement of the tool.

The operative connection between the worm shaft 88 and the drive shaft 107 of motor 86 is here effected by a belt 108 engaging pulleys 109 and 111 mounted on the shafts 88 and 107 respectively at the rear side of the machine. Preferably a plurality of different size pulleys are mounted on the shafts 88 and 107 for selective engagement with the belt 108 for driving the worm 87 at different speeds. The motor 86 is preferably mounted at the opposite side of the column 12 with respect to the worm shaft 88 and in horizontal position so as to position the motor shaft 107 in substantially parallel relation to the worm shaft 88, the motor here being supported on a pair of arms 112 extending transversely from the part of the body surrounding the column. A suitable clamp 113 is carried by the base of the motor for engagement with the arms 112, thereby permitting adjustment of the motor position to take up slack in the belt 108.

Preferably and in accordance with the present construction, an indicator mechanism is incorporated in the machine and coordinated with the movement of the spindle 34 so as to accurately inform the operator as to the length of thread being cut. As here shown, a dial indicator 114 is supported on the body at the lower front thereof and provided with an operating reciprocating part 116 positioned vertically on the top of the indicator. A stem 117 is mounted vertically above the indicator part 116 and in alignment therewith and is mounted in a sleeve 118 slidably carried for vertical reciprocation in a bore 119 in the collar part 44 of the body. Secured to the sleeve as by means of an arm 121, see Figures 2 and 5, is a reciprocating plunger member 122 carried in bore 123 in the body part directly under the disc nut 39 on top of the spindle. A helical spring 124 is compressed within the bore 123 so as to resiliently urge the plunger member 122 upward against the disc 39 and a roller 126 is carried at the upper end of the plunger for engagement with the under-side of the disc. Preferably and as here shown, in order to balance the force on the disc 39, a second spring pressed plunger member 127 of similar construction and mounting as member 122 is provided at the opposite side of the spindle from member 122 and engages a diametrically opposite part of the disc 39.

As an important feature of the present construction, the actuating rod or stem 117 is connected to its motivating sleeve 118 by means of a fixed friction which is just sufficient to hold the rod and to operate the indicator mechanism but which will permit the rod to slip in the sleeve upon over-running of the mechanism to prevent injury to the relatively delicate indicator mechanism. As illustrated in Figures 9 and 10, the rod 117 is connected to the sleeve 118 at the upper end of the latter by means of a conical shaped washer member 128 surrounding the rod and seated in a conical socket 129 in the end of the sleeve. The member 128 is slitted in part and relieved in part so as to open and close about the rod depending upon the pressure with which it is urged against the conical seat 129 and which pressure is here controlled by a helical spring 131 surrounding the rod above the member 128 and compressed thereagainst by means of a sleeve nut 132 threaded at its lower end onto the bore end of sleeve 118. By means of this construction and as will be understood, the rod 117 may be readily adjusted as to its longitudinal position in the sleeve 118 and the amount of frictional holding between the rod and sleeve may be readily selected.

In accordance with the foregoing it will be understood that upon rotary downward movement of the spindle, the members 122 and 127 will be depressed by reason of the movement of disc 39 against the rollers at the top of these members and correspondingly the sleeve 118 and stem 117 will be depressed to actuate the indicator 114. Upon the return longitudinal movement of the spindle, the stem 117 and connected parts will be correspondingly elevated by the spring 124. In the type of indicator as here illustrated, the operating part 116 is normally resiliently urged to an extended position and hence the part 116 will follow the stem in its upward movement to provide a corresponding actuation of the indicator.

One of the important features of the spindle assembly is that the spindle is full-floating in a vertical direction and is supported only and exclusively by the lead screw means 36. As a result thereof the spindle is immediately responsive to the starting and stopping and reversing operation of the clutch mechanism and at the same time is able to exactly follow the feed pattern of the lead screw means with the result that very accurate and precise thread cutting may be done.

I claim:

1. A thread cutting machine comprising, a support, a quill rotatably mounted thereon in vertical position for rotation about a vertical axis, a spindle carried by said quill and keyed thereto for joint rotation but permitting free longitudinal movement of said spindle relative to said quill along the vertical axis of rotation, said spindle being adapted for connection to a thread cutting tool, a motor, a worm carried by said support and driven by said motor, worm gears engaged with said worm on opposite sides thereof and driven thereby in opposite directions of rotation, a sprocket connected to and driven by each of said worm gears, a pair of clutch plates mounted on said quill in longitudinally spaced positions and being free for rotation relative to said quill, a sprocket connected to each of said clutch plates, chains connecting said first sprockets with said second sprockets for constantly rotating said clutch plates in opposite directions, a clutch member mounted on said quill between said clutch plates and being keyed to said quill for joint rotation therewith but movable longitudinally on said quill to engage said clutch plates, manually operated means mounted on said support and connected to said clutch member for reciprocation thereof longitudinally on said quill between positions engaged with said clutch plates, and lead screw means connecting said spindle and support and providing reciprocation of said spindle upon rotation thereof in opposite directions.

2. A thread cutting machine comprising, a support, a spindle threadably carried thereby for relative rotary and longitudinal movement and adapted for connection to a thread cutting tool, a part adapted to be continuously rotated, members connected to said part and continuously driven thereby in reverse directions of rotation, a clutch member connected to said spindle and movable into positions engaged with either of said first members and a neutral position out of engagement therewith, manually operated means connected to said clutch member for moving the same into said positions and including a shaft rotatably mounted on said support, a member guided for reciprocation along a line at right angles to and intersecting the axis of rotation of said shaft and connected thereto at diametrically opposed portions thereof, and spring means urging said last named reciprocating member towards said shaft to resiliently hold the latter in a predetermined position thereof responding to the aforesaid neutral position of said clutch member.

3. A thread cutting machine comprising, a support, a quill rotatably mounted thereon, a spindle carried by said quill and keyed thereto for joint rotation but permitting free longitudinal movement of said spindle relative to said quill, said spindle being adapted for connection to a thread cutting tool, a part adapted to be continuously rotated, members connected to said part and continuously driven thereby in reverse directions, a manually operated clutch member connected to said quill and selectively engageable with said first members to rotate said quill in opposite directions, lead screw means connecting said spindle and support, providing reciprocation of said spindle upon rotation thereof in opposite directions, an indicator having a reciprocating operating part mounted for movement along a line parallel to said spindle, a stem member reciprocally carried by said support in alignment with said part and engaged therewith at one end of said stem member, a disc mounted on said spindle for rotation therewith adjacent the opposite end of said stem member, and means connecting said stem member with said spindle for joint reciprocation and including a part secured to the opposite end of said stem member and having a roller engagement with said disc.

MALCOLM E. MITCHELL.